United States Patent
Parron et al.

(10) Patent No.: US 11,337,270 B2
(45) Date of Patent: May 17, 2022

(54) BUFFER STATUS REPORT ENHANCEMENTS FOR TCP FLOW

(71) Applicant: APPLE INC., Cupertino, CA (US)

(72) Inventors: Jerome Parron, Fuerth (DE); Hyung-Nam Choi, Hamburg (DE); Jing Zhu, Portland, OR (US); Marcus Mertens, Nuremberg (DE); Christian Hofmann, Nuremberg (DE); Sudeep Palat, Cheltenham (GB)

(73) Assignee: APPLE INC., Cupertino, CA (US)

( * ) Notice: Subject to any disclaimer, the term of this patent is extended or adjusted under 35 U.S.C. 154(b) by 160 days.

(21) Appl. No.: 16/481,792

(22) PCT Filed: Jan. 23, 2018

(86) PCT No.: PCT/US2018/014859
§ 371 (c)(1),
(2) Date: Jul. 29, 2019

(87) PCT Pub. No.: WO2018/140401
PCT Pub. Date: Aug. 2, 2018

(65) Prior Publication Data
US 2019/0387577 A1    Dec. 19, 2019

Related U.S. Application Data

(60) Provisional application No. 62/458,382, filed on Feb. 13, 2017, provisional application No. 62/451,507, filed on Jan. 27, 2017.

(51) Int. Cl.
*H04W 88/02* (2009.01)
*H04W 76/27* (2018.01)
(Continued)

(52) U.S. Cl.
CPC ......... *H04W 88/02* (2013.01); *H04L 47/2466* (2013.01); *H04W 28/0263* (2013.01);
(Continued)

(58) Field of Classification Search
None
See application file for complete search history.

(56) References Cited

U.S. PATENT DOCUMENTS

| 2016/0285775 A1* | 9/2016 | Damnjanovic ... H04W 28/0278 |
| 2018/0084542 A1* | 3/2018 | Fujishiro ............... H04L 1/0023 |
| 2018/0199230 A1* | 7/2018 | Lee ................... H04W 28/0278 |

FOREIGN PATENT DOCUMENTS

EP    2958387 A1    12/2015

OTHER PUBLICATIONS

3GPP TR 36.933 V14.0.0; Technical Specification Group Radio Access Network; Study on Context Aware Service Delivery in RAN for LTE; (Release 14) (Mar. 2017); Valbonne France.
(Continued)

*Primary Examiner* — Alex Skripnikov

(57) ABSTRACT

Technology for a user equipment (UE), operable to generate an enhanced buffer status report (eBSR) is disclosed. The UE can identify packets for uplink transmission. The UE can filter the packets for transmission, to identify a number of small packets pending for transmission and a number of larger packets, relative to the small packets, that are pending for transmission in the uplink transmission. The UE can encode the eBSR for transmission to a next generation node B (gNB), wherein the eBSR includes information identifying the number of small packets pending for transmission. The UE can have a memory interface configured to send to a memory the number of small packets pending for transmission.

18 Claims, 14 Drawing Sheets

(51) Int. Cl.
*H04L 47/2466* (2022.01)
*H04W 28/02* (2009.01)
*H04W 72/14* (2009.01)
*H04W 80/02* (2009.01)
*H04L 1/16* (2006.01)

(52) U.S. Cl.
CPC ... *H04W 28/0268* (2013.01); *H04W 28/0278* (2013.01); *H04W 72/14* (2013.01); *H04W 76/27* (2018.02); *H04W 80/02* (2013.01); *H04L 1/1614* (2013.01)

(56) References Cited

OTHER PUBLICATIONS

R2-1700354; 3GPP TSG-RAN WG2 Mtg #NR; Title: Discussion on uplink scheduling procedure in NR; Source: ASUSTeK; Agenda Item: 3.2.1.4; Spokane, WA, USA; Jan. 17-19, 2017.

* cited by examiner

BUFFER STATUS REPORT ENHANCEMENTS FOR TCP FLOW

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
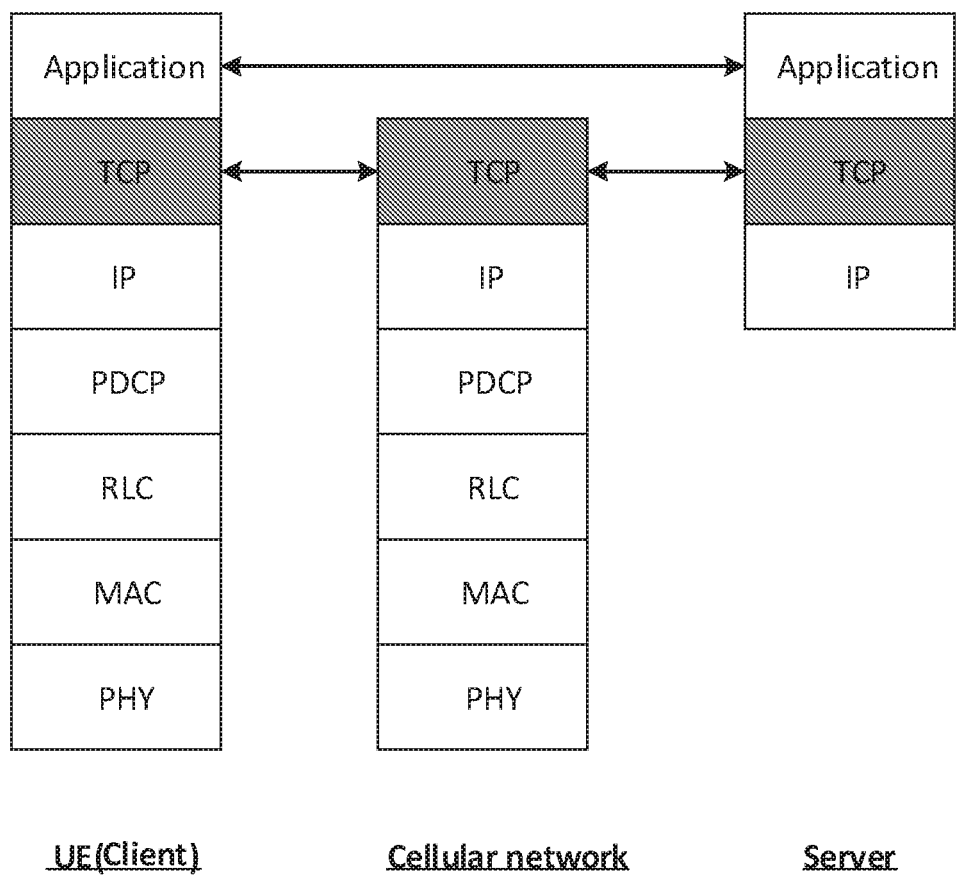
FIG. 1 illustrates signaling between applications in a user equipment (UE) and network protocol layer for Transmission Control Protocol (TCP), in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). In 3GPP fifth generation (5G) LTE communication systems, the node is commonly referred to as a new radio (NR) or next generation Node B (gNodeB or gNB). The downlink (DL) transmission can be a communication from the node (e.g., eNodeB or gNodeB) to the wireless device (e.g., UE), and the uplink (UL) transmission can be a communication from the wireless device to the node.

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network. The UE can be one or more of a smart phone, a tablet computing device, a laptop computer, an internet of things (TOT) device, and/or another type of computing devices that is configured to provide digital communications.

As used herein, digital communications can include data and/or voice communications, as well as control information. As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

The present technology describes applications which provide reliable data transfer that can rely on TCP (Transmission Control Protocol). Further, there can be configurations to enhance the buffer status report (BSR) sent by the UE to the eNB to notify the number (or size) of TCP Acknowledgements (ACKs) pending in addition to the total size of data pending. In some embodiments, the TCP stack can generate TCP ACKs at different ratios based on the received throughput. This typically cannot be predicted very well by the gNB.

By notifying to the gNB of the amount of small packets (TCP ACK) and large packets (user data), the gNB has a better visibility on the amount and type of data pending on the UE side. The gNB can then allocate radio resources accordingly. The gNB can decide to allocate a series of short grants for a continuous transmission of TCP ACKs which are delay sensitive and can send less frequent but larger uplink (UL) grants to transmit user data in larger data packets (can be up to 1470 bytes per internet protocol (IP) packet). Consequently, when the delivery of a UL TCP ACK is more regular (received more often, and in fewer bursts), better downlink (DL) throughput can be achieved. Transmitting the UL TCP ACKs more frequently also leads to a better radio resource usage as the more frequent transmission avoids device overload in the case of a large grant and reduces the risk to add large amounts of padding bits in the transport block to be sent while data is still pending for transmission. The gNB can then determine a desired scheduling pattern to allocate UL radio resources to the UE.

TCP, is a "connection-oriented" data delivery service, such that two TCP configured devices can establish a TCP connection with each other to enable the communication of data between the two TCP devices. A device may refer to one or more of a client, a server, an application, a base station, or several different variations of user equipment. In general, "data" may refer to TCP segments or bytes of data. In addition, TCP is a full duplex protocol. Therefore, each of the two TCP devices may support a pair of data streams flowing in opposite directions. Therefore, a first TCP device may communicate (i.e., send or receive) TCP segments with a second TCP device, and the second TCP device may communicate (i.e., send or receive) TCP segments with the first TCP device.

The sending TCP device may expect an acknowledgement (ACK) from the receiving TCP device after the receiving TCP device receives the data from the sending TCP device. In other words, the receiving TCP device may communicate an ACK message to the sending TCP device after receiving the TCP data transmission. If the ACK is not received within a timeout interval, then the TCP transmission may be retransmitted. Thus, if the sending TCP device does not receive the ACK message from the receiving TCP device within a timeout interval, then the sending TCP device may re-communicate the TCP transmission to the receiving TCP device.

The ACK message communicated between the receiving TCP device and the sending TCP device may include the number of TCP transmission that the receiving TCP device can receive from the sending TCP device beyond the last received TCP transmission. In general, TCP devices may temporarily store the TCP transmission received from the network element in a buffer before the TCP transmissions are communicated to a display device.

A typical IP packet size for TCP ACK size is 52 bytes in Internet Protocol Version 4 (IPv4). For high throughput, the IP packet for user data is usually much larger. For example, the IP packet size for IP data can be up to a maximum transmission unit (MTU) MTU size of 1470 bytes. Accordingly, the quantity of small packets that are pending can be distinguished from the large packets that are pending for the gNB. By distinguishing the small packets from the large packets, the TCP ACK messages in the small packets can be communicated more frequently, and/or at a higher priority level to better allocate the radio resources to the UE.

TCP data transfer is typically very sensitive to jitter and data loss that is impacting the overall throughput. This is particularly visible in a cellular network where the radio link quality can vary quickly. In the case of a bottleneck in uplink transmission, when the UE doesn't receive enough of a grant indication or does not receive a grant fast enough, the UE has to buffer data. In one example, the TCP ACK can be released or dropped when it has aged to a predetermined time period. In another example, the TCP ACK and user data can consist of interleaving. With increasing throughput and new NR low latency specifications, the UE may need to prepare data in advance for transmission. The UE has to tradeoff between preparing data in advance to minimize processing time when an UL grant is received or do it at the last minute when the grant is received. When data is prepared at the last minute, the risk is that not all packets can be processed to fill in the transmission block (TB). If processing is done in advance, then the UE needs to determine a ratio between TCP ACK and other packets.

FIG. 1 illustrates signaling between applications in a user equipment (UE) at the network protocol layer for Transmission Control Protocol (TCP). In FIG. 1 an exemplary protocol layer model for TCP is shown including the UE (Client), the cellular network, and the Server. TCP provides reliability by maintaining a running estimated average of the Round Trip Time (RTT) and its mean deviation, and by retransmitting any packet, whose ACK is not received in a certain time. TCP operates on the assumption that all packet losses occur due to congestion only. The operation of TCP in wireless environments, e.g. in cellular networks such as LTE or 5G may result in significant performance degradation (in terms of end-to-end delay and throughput) especially for applications having high-data rate and low latency. For these kinds of applications, TCP has difficulties adapting also to the fluctuation of the underlying radio channel conditions of the cellular radio link efficiently.

For instance, at a high downlink (DL) throughput, the UE can send many TCP ACKs in an UL communication. The TCP ACKs in the UL are sent in parallel to any other user data transfer. In the case of congestion or fluctuation of the radio resources for the UL, the UE may not receive enough resources allocated by the eNB to send all UL data. In addition, the sending of UL data can be delayed, leading to either a local drop of a TCP ACK or to a bursty delivery of a TCP ACK. This jitter in TCP ACK sending in UL can lead to a degradation of the downlink (DL) TCP throughput.

Another issue can occur when the UE receives a large UL grant from a gNB and many TCP ACKs are pending. In this case, the number of packets to process is relatively high due to the small size of the TCP ACKs compared with a size of the data IP packets. Prior to the physical layer (PHY) configurations, the protocol layers (Packet Data Convergence Protocol (PDCP), Radio Link Control (RLC) and Medium Access Control (MAC)), are configured to cipher instructions and internal buffer descriptors are processed per packet, thereby leading to a relatively high central processing unit (CPU) load. When a sufficient number of TCP ACKs are pending, a UE may not have enough resources to process all of the packets in the necessary time, and thus cannot send all the pending TCP ACKs in the available radio resources. As a consequence, on the MAC layer, large amounts of padding bits are added in the transport block (TB) to be sent over the radio interface even though data is still pending in the queue for transmission. This will lead to a waste of radio resources due to the padding and the gNB will have to schedule another UL grant to the UE.

In view of the ongoing studies for LTE and new radio (NR, 5G), technology for improving the TCP performance is proposed by enhancing the buffer status reporting from the UE to the gNB.

Figure 2:
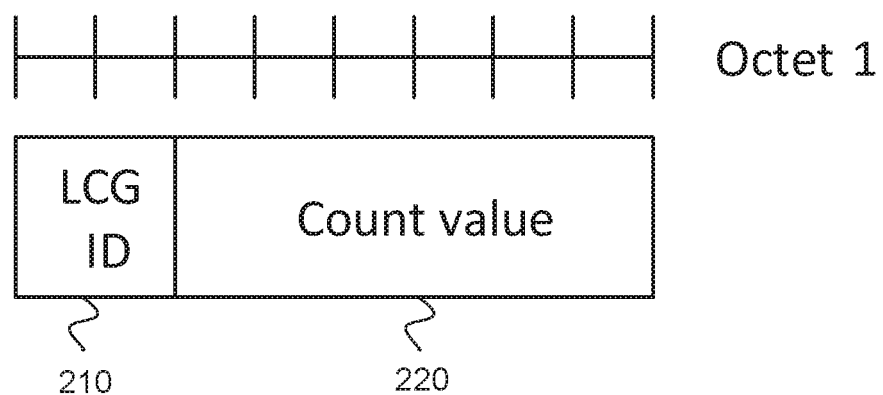
FIG. 2 illustrates structure of enhanced Buffer Status Report (eBSR), in accordance with an example.

FIG. 2 illustrates a structure of an enhanced Buffer Status Report (eBSR). The eBSR can contain a count value 220 or a total size of pending small packets. Considering the small size of the packet, a count value 220 can be a valid alternative, especially if a filter type is used to identify the number of small packets and the packet type can be precisely identified (such as TCP ACK). In FIG. 2 an exemplary structure of an eBSR is shown. In the example, the length of the eBSR is 1 byte, containing 2 bits of Logical Channel Group Identification (LCG ID) 210. The LCG ID can be used for identifying the group of logical channel(s) to which the buffer status is being reported. The eBSR can further comprise 6 bits of count value 220. The count value 220 can indicate a number of packets with a size less than X bytes. The value of X can be a positive integer. The value of X can be locally configured in the UE or configured by the gNB. In an alternative embodiment, the count value 220 can indicate the total size of pending small packets. For example, the number of bits or bytes in the pending small packets.

Figure 3:
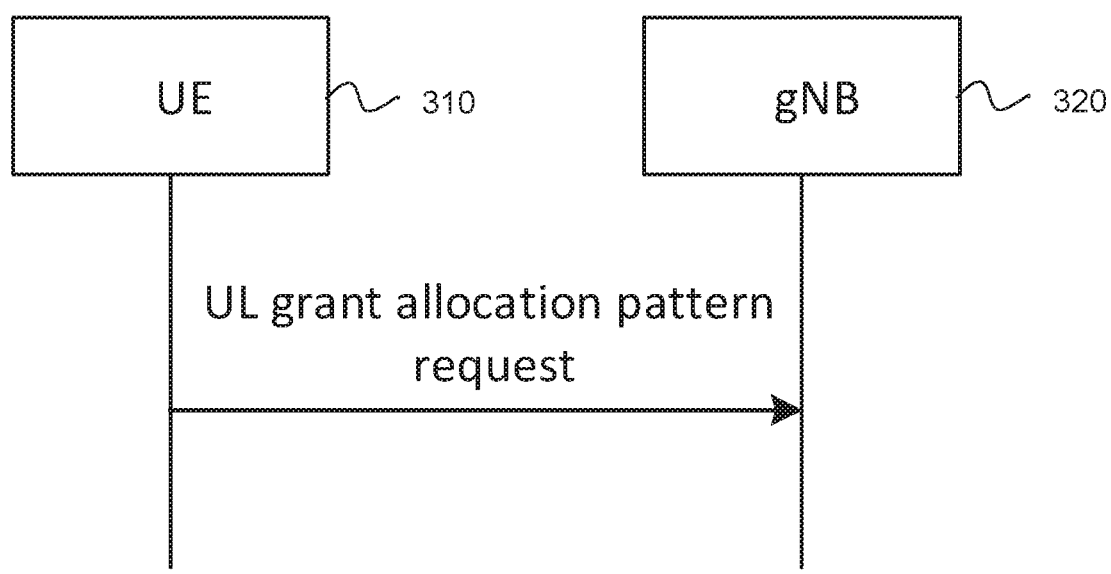
FIG. 3 illustrates signaling of an uplink (UL) grant allocation pattern request, in accordance with an example.

FIG. 3 illustrates signaling of an uplink (UL) grant allocation pattern request. Based on an eBSR, the gNB 320 can optimize the allocation of the UL grant size and the UL grant occurrence. In one example, if the pending packets are relatively large, and are less delay sensitive, large uplink grants can be allocated with less timing constraints. In an alternative example, if small and delay sensitive packets are pending, relatively small grants can be allocated but with a higher frequency.

In accordance with a further enhancement, the UE can request the eNB for a UL grant allocation pattern based on the measured DL TCP throughput and TCP ACK ratio. The UE 310 can estimate the average DL TCP throughput and determine the corresponding generated TCP ACKs in the uplink. The number of ACKs can directly be provided by the TCP stack or the cellular protocol stack in the UE 310. Alternatively, the UE 310 can determine the number of TCP ACKs by counting the number of TCP ACKs transmitted over the air. The UE 310 can then assume that, in the next time window, for instance in the next 10 ms, the DL TCP throughput and corresponding UL TCP ACK generation will remain substantially the same. The UE 310 can generate and send a "UL grant allocation pattern request" message to the eNB 320 to indicate the number of TCP ACKs to be sent in the next, for example 10 ms, time window and the desired UL grant pattern. The eNB 320 can then autonomously allocate the corresponding UL grant(s) for the next 10 ms. The UE 310 can generate a periodic "UL grant allocation pattern request" to regularly update the eNB 320 of the amount of TCP ACKs and the desired UL grant pattern. The period of this message as well as the time window (in this example, 10 ms) to compute the amount of expected UL TCP ACKs can be configured by the eNB 320.

The UL grant allocation pattern request can be sent as a MAC control element (CE) or a radio resource control (RRC) message to the eNB 320. The UL grant allocation pattern request can be incorporated in of an enhanced BSR, as described above. Alternatively, the UL grant allocation pattern request can comprise a bitmap of length x bits, where x is a positive integer, e.g. 10 bits or 40 bits. Each bit in the bitmap can correspond to a subframe of 1 ms. A value of 0 in the bitmap can indicate that an UL grant is not requested to be allocated in the corresponding subframe. A value of 1 in the bitmap can indicate that an UL grant is requested to be allocated in the corresponding subframe, or vice versa. With the requested UL grant allocation pattern, the UE 310 can indicate in advance to the eNB 320 the amount of resources needed in UL to transmit the UL grant.

Detection of TCP ACK

For a given QoS flow, the UE can determine the TCP ACK by using an implementation specific process, such as packet inspection, or using a filter configured by the next generation node B (gNB) or NR (new radio) core network.

In one embodiment, in case of implementation specific detection, the UE can check the ACK bit in the flag field of the TCP header to detect a TCP ACK. Additional parameters can be used for filtering, such as a protocol type or a packet size. The protocol type or packet size may be used, for instance, if the ACK bit is not sufficiently based on a TCP stack or a network behavior or if the UE is configured to prioritize only particular TCP ACKs. For instance, the UE can be configured to prioritize only TCP ACKs in small packets and not TCP ACKs that piggybacked in a larger data packet.

In one embodiment, in the case of a filter that is configured by the network, the network can provide a detection pattern using traffic flow templates (TFT) or a bitmask. This would give the flexibility for the network to prioritize TCP ACKs or other messages.

Prioritization of TCP ACK

There are further examples and subsequent embodiments disclosed to disclose a process for prioritization of TCP ACKs in transmission of the air interface to reduce the delay of TCP ACK transmissions and minimize the risk of TCP ACK filtering (drop of data). Further, processes are disclosed to detect an ACK and transmit the ACK on a higher priority DRB. In certain embodiments, having a dedicated DRB with higher priority for a transmission of TCP ACKs versus normal data can help to reduce Round Trip Time (RTT) for TCP communication.

In one embodiment, when a high priority DRB is used for transmission of TCP ACKs (compared to normal data), the logical channel prioritization applied in the UL by the UE will result in TCP ACKs being prioritized over normal data and sent in the UL when the UL grant is not sufficient for both data and the TCP ACKs. The use of a high priority DRB for transmitting TCP ACKs gives more control to the gNB on the data prioritization and allows more consistency in the TCP traffic between all UE manufacturers.

In one embodiment, the gNB can obtain more visibility on the number of ACKs pending using a BSR ID within the TCP ACK transmission that can correspond to a dedicated radio bearer. This will help the gNB to better schedule the UL resource allocation.

In one embodiment, having a dedicated DRB for TCP ACK transmission can enable a compression algorithm, such as robust header compression (RoHC) for a TCP ACK DRB only, hence avoiding unnecessary processing time due to RoHC compression of normal user data.

In one embodiment, there can be an instance where no delay is introduced to PDCP re-ordering on the receiver side. If a dedicated DRB is used for TCP ACK, a missing user data packet will not delay the delivery of the TCP ACK to a TCP stack. In order to improve TCP ACK prioritization, the device can detect a TCP ACK for a specific flow and send with a bearer (either a new bearer or an existing one) with a higher priority.

Figure 4:
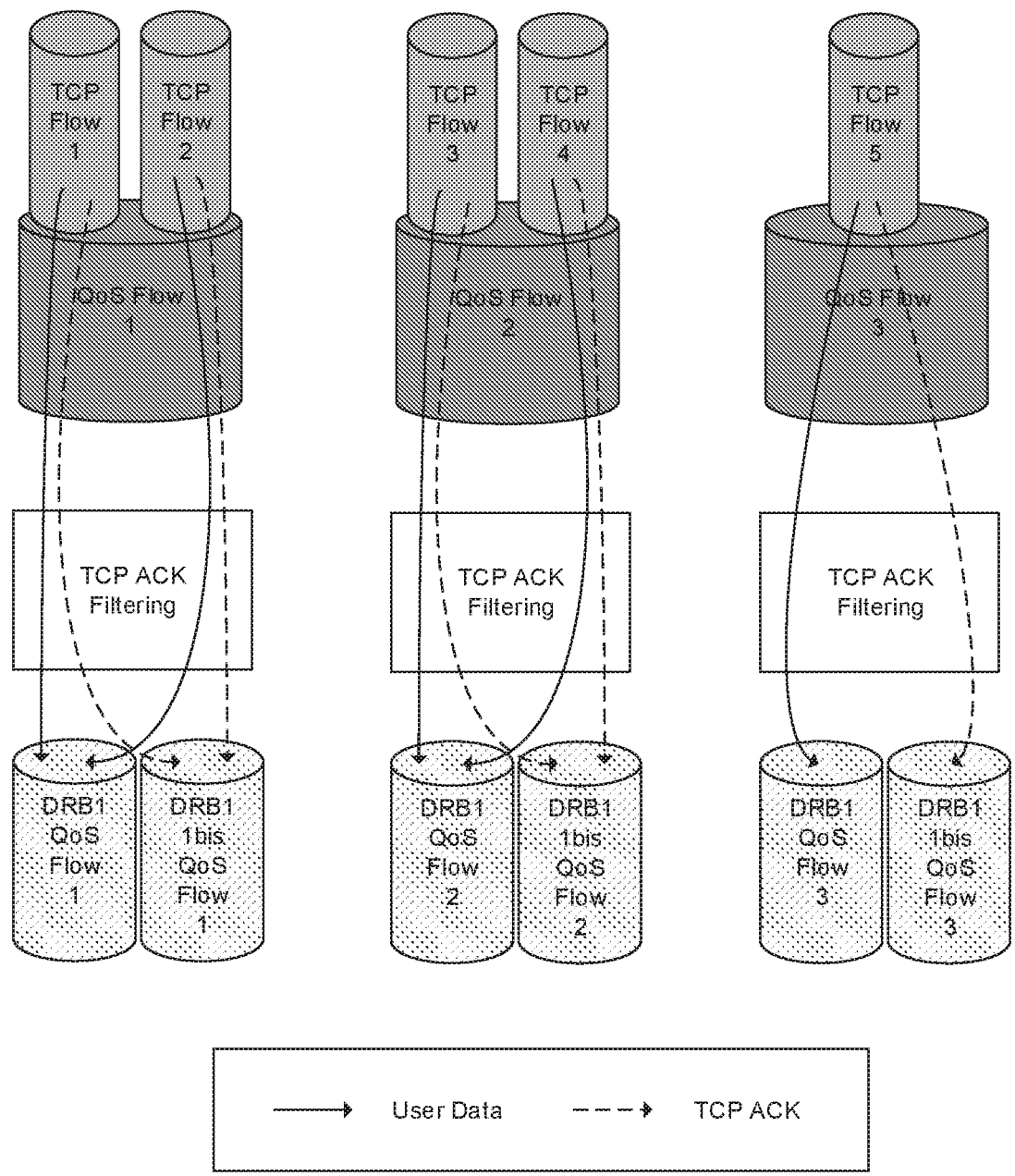
FIG. 4 illustrates an addition of one data radio bearer (DRB) per flow of quality of service (QoS) for TCP acknowledgment (ACK), in accordance with an example.

FIG. 4 illustrates an addition of one data radio bearer (DRB) per flow of quality of service (QoS) for TCP acknowledgments (ACKs). FIG. 4 illustrates one or more TCP flows per QoS flow, a TCP ACK filtering module, and one or more corresponding DRB QoS Flows. Each of the modules, such as the TCP ACK filtering module, and the flows are configured and operable to route or transmit user data and TCP ACKs to the appropriate DRB radio bearer, as illustrated in FIG. 4.

In one embodiment, there can be a creation of a new DRB dedicated for "TCP ACK" per QoS flow DRB. For example, if a TCP flow is present in a QoS flow, another DRB with a higher priority is associated to the main QoS DRB.

Figure 5:
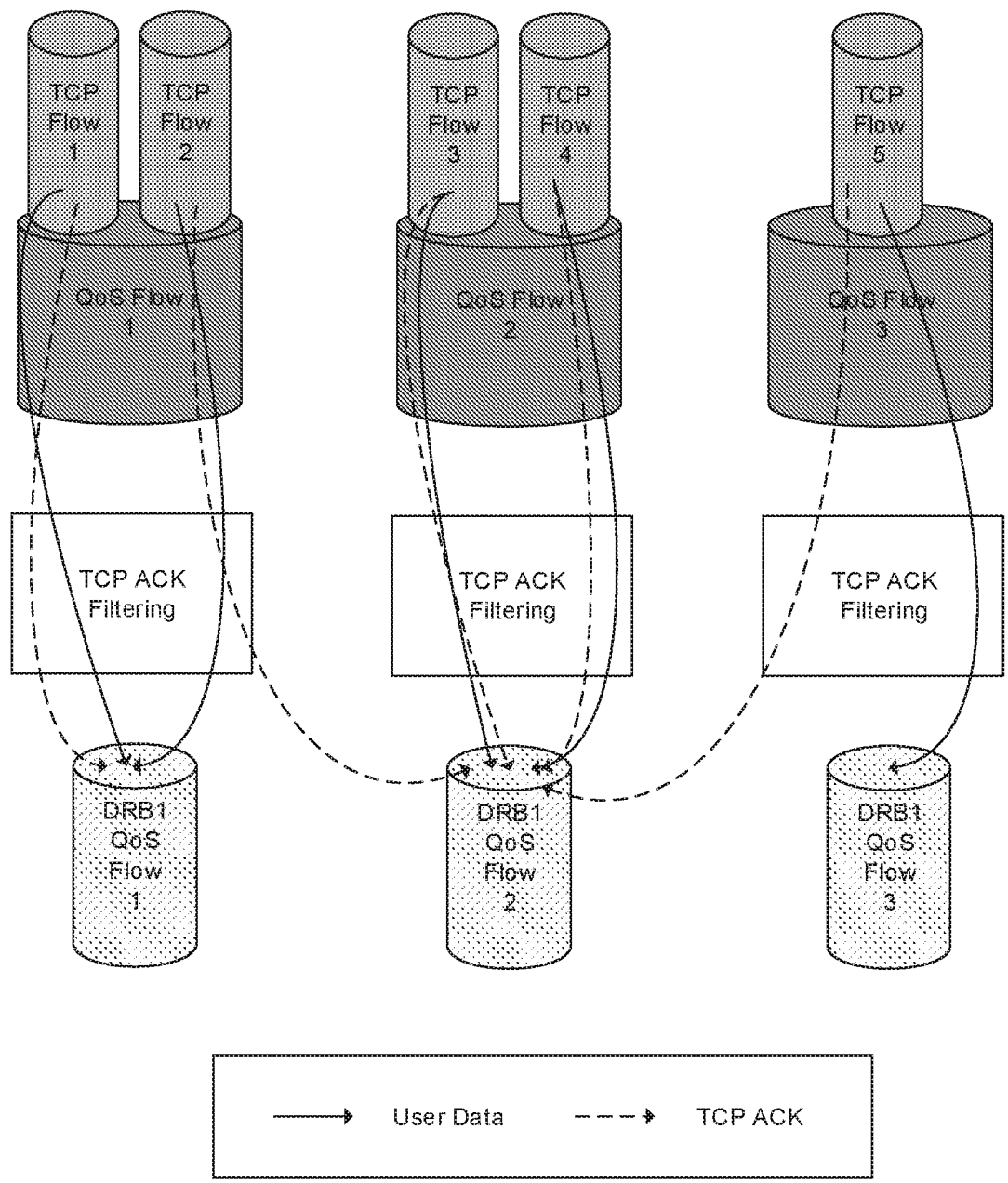
FIG. 5 illustrates re-routing of TCP ACK to a higher priority DRB, in accordance with an example.

FIG. 5 illustrates re-routing of TCP ACKs to a higher priority DRB. The illustrated flow comprises one or more TCP flows per QoS flow, a TCP ACK filtering module, and one or more corresponding DRB QoS Flows. Each of the modules and flows are configured and operable to route or transmit user data and TCP ACKs.

In one embodiment there can be a reuse of a higher priority DRB for TCP ACKs of some or all QoS flows, if the higher priority DRB is available. In this example, higher priority data packets can also be directed to the higher priority DRB. With this approach, the TCP ACKs can be transmitted in the DRB with a higher, or the highest priority. In another alternative, the gNB can indicate which existing DRB is to be used for transmission of TCP ACKs.

Figure 6:
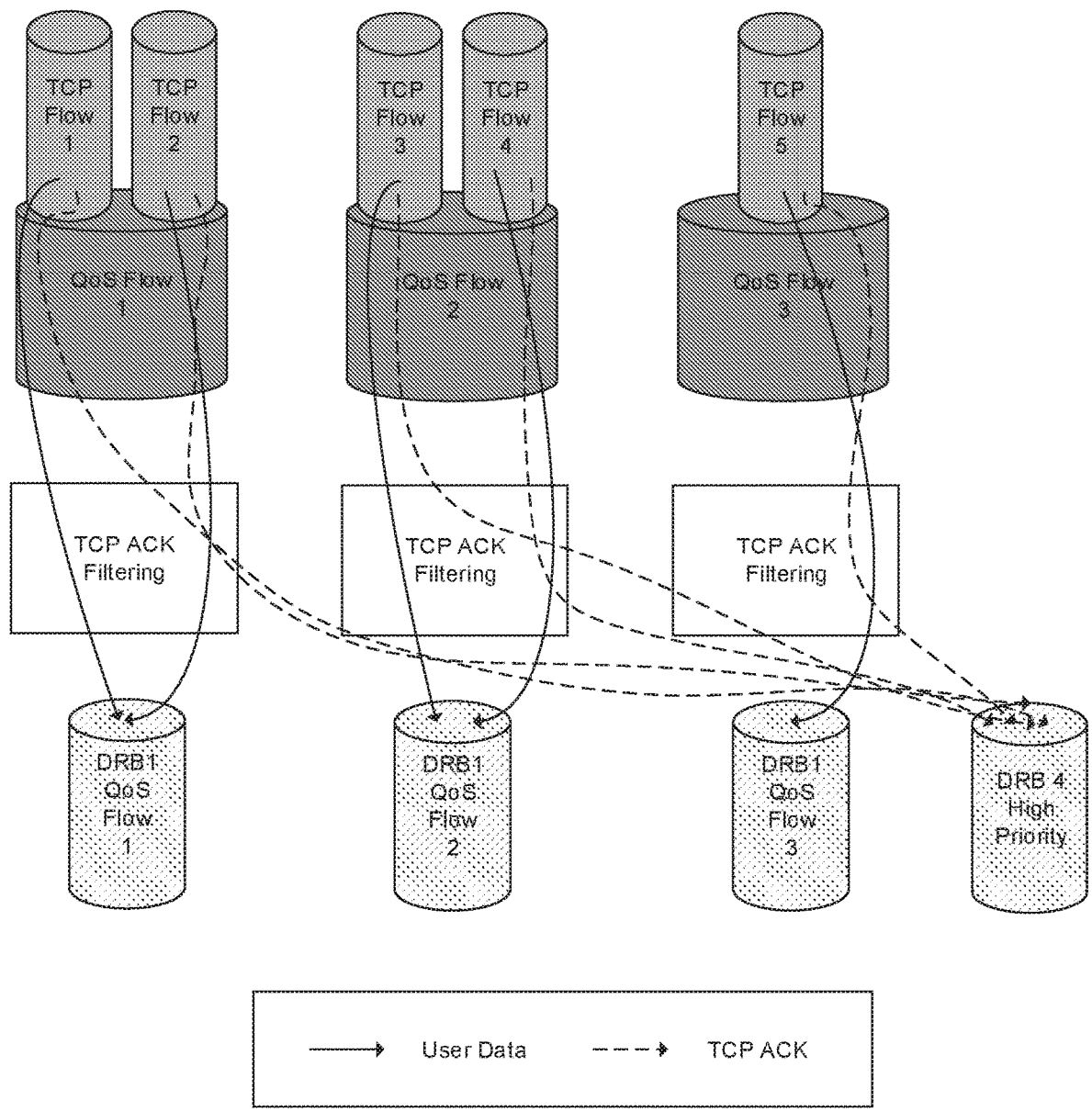
FIG. 6 an addition of a common high priority DRB for TCP ACK of some or all QoS flow, in accordance with an example.

FIG. 6 provides an example illustration of a common high priority DRB for transmission of TCP ACKs of some or all QoS flows. The illustrated flow comprises one or more TCP flows per QoS flow, a TCP ACK filtering module, and one or more corresponding DRB QoS Flows. Each of the modules and flows are configured and operable to route or transmit user data and TCP ACK.

In one embodiment, a new DRB can be added for dedicated TCP ACK transmission of TCP ACKs of all QoS flows. With this approach, the gNB or NR network can create a DRB for all TCP ACKs of all QoS flows.

In another embodiment, the QoS model for 5G with next generation (NG) Core allows gNBs (network RAN) to set up DRBs without involvement of the other network nodes. gNBs can hence set up the DRB for TCP ACKs on its own.

In another embodiment, the gNB can also configure, with RRC signaling, for which QoS flow DRB the TCP ACK prioritization is allowed.

In an alternative embodiment, the core network (CN) can also provide the filters for TCP ACKs and request the setup of a higher priority QoS flow which then results in the gNB setting up the higher priority DRB. This configuration can be performed using non-access stratum (NAS) signaling.

In one embodiment, when receiving data, the gNB can use a flow id to route the received packet to the right user-plane function.

In one embodiment, a combination of dropping of some TCP ACKs with the prioritization of some other TCP ACKs can also be used to provide for optimal TCP performance.

Figure 7:
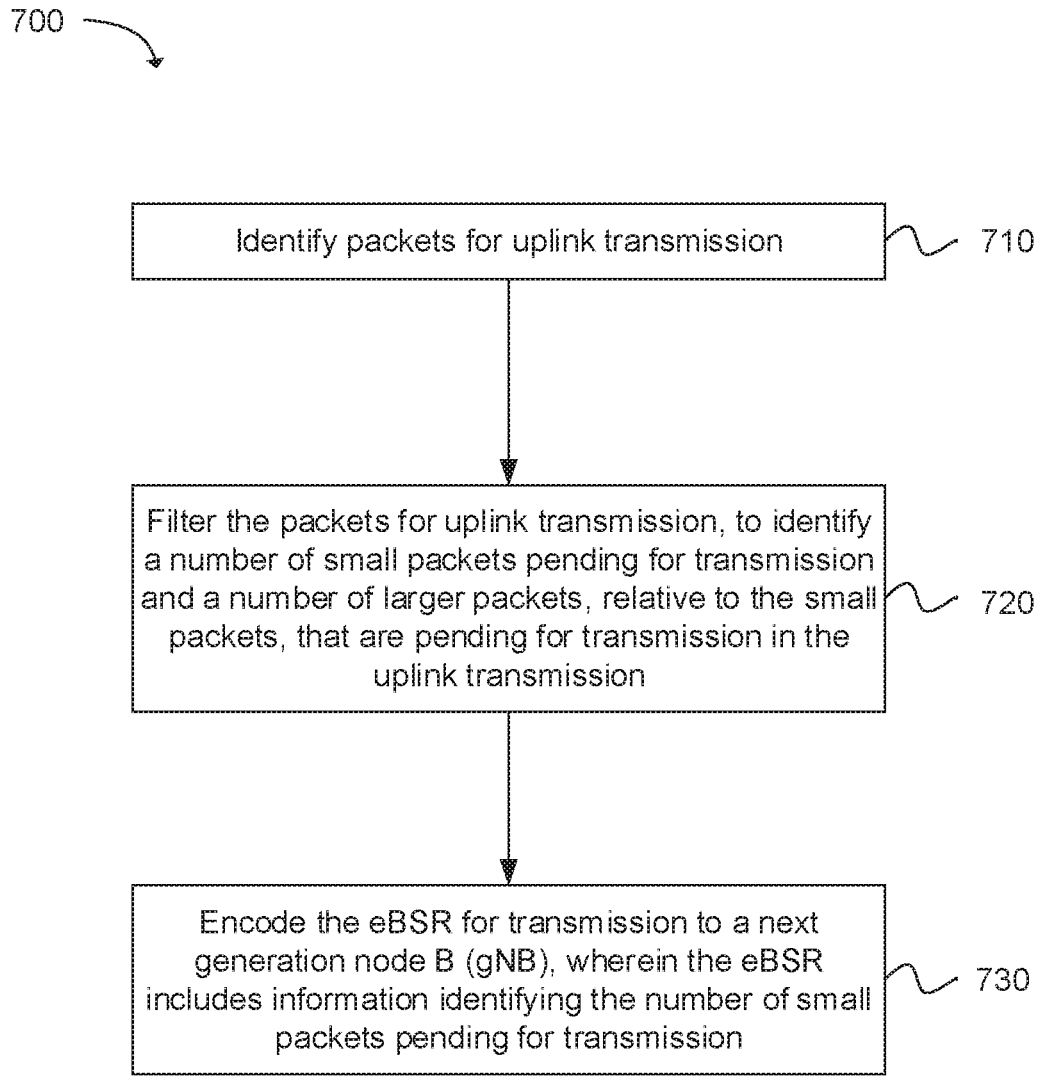
FIG. 7 depicts functionality of a user equipment (UE), operable to generate an enhanced buffer status report (eBSR), in accordance with an example.

FIG. 7 depicts functionality of a user equipment (UE) 700, operable to generate an enhanced buffer status report (eBSR). The UE can comprise one or more processors configured to identify packets for uplink transmission 710. The UE can comprise one or more processors configured to filter the packets for uplink transmission, to identify a number of small packets pending for transmission and a number of larger packets, relative to the small packets, that are pending for transmission in the uplink transmission 720. The UE can comprise one or more processors configured to encode the eBSR for transmission to a next generation node B (gNB), wherein the eBSR includes information identifying the number of small packets pending for transmission 730.

In one embodiment, the one or more processors are further configured to filter the packets for uplink transmission to identify transmission control protocol (TCP) acknowledgement (ACK) packets in the packets for uplink transmission.

In one embodiment, the one or more processors are further configured to filter the packets for uplink transmission to identify packets with a packet size less than X bytes as the small packets that are pending for transmission in the uplink transmission, wherein X is an integer greater than 0.

In one embodiment, the one or more processors are further configured to encode the eBSR for transmission to the gNB wherein the eBSR includes a logic channel group (LCG) identification (ID) and a count value, wherein the count value includes one or more of: a number of packets with a packet size less than X bytes as the small packets that are pending for transmission in the uplink transmission, wherein X is an integer greater than 0; or a total size of the number of small packets pending for transmission.

In one embodiment, the one or more processors are further configured to decode from the gNB a reporting method for the eBSR, wherein the reporting method comprises one or more of the total size or the number of packets.

In one embodiment, the one or more processors are further configured to decode an uplink (UL) grant received from the gNB, wherein a size of the UL grant and a frequency of the UL grant are determined by the gNB based on the information in the eBSR to identify the number of small packets pending for transmission.

Figure 8:
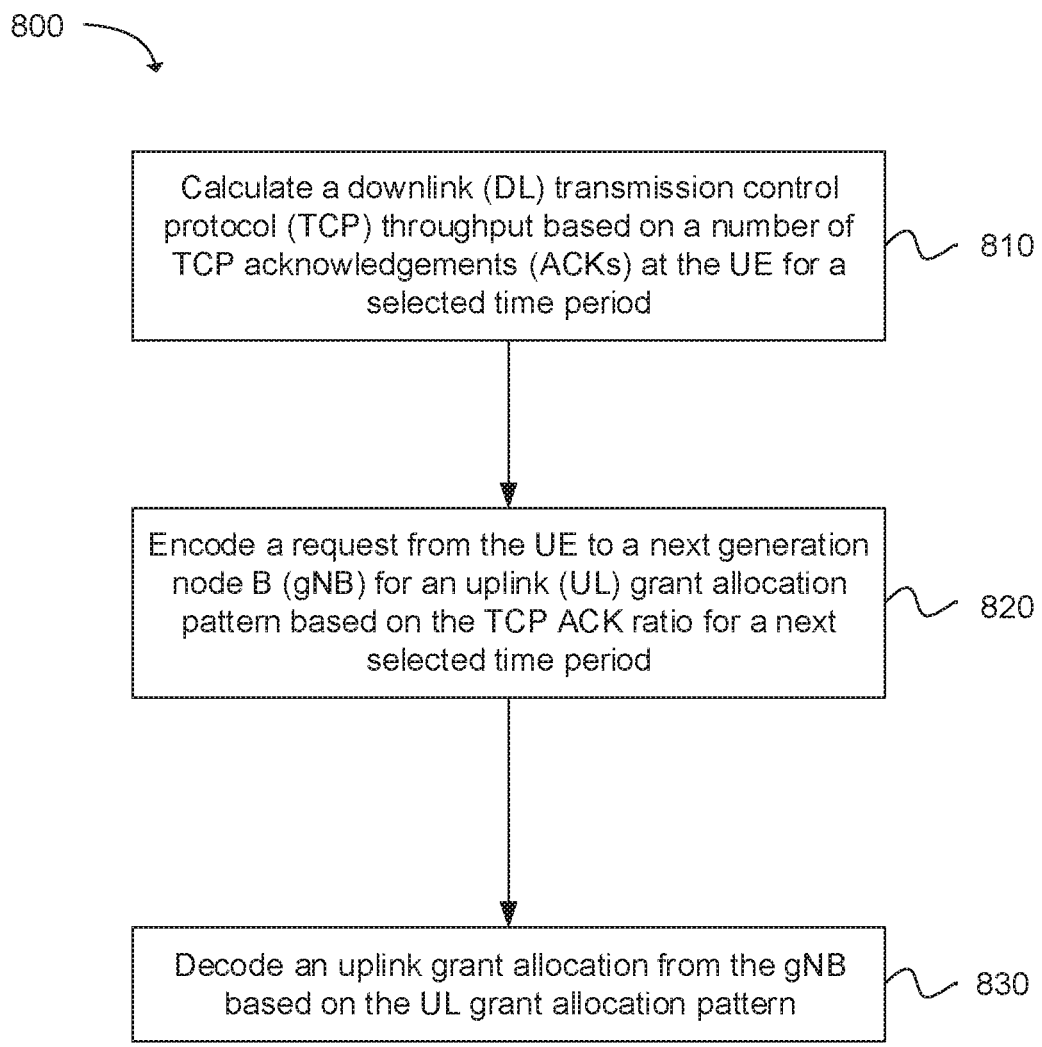
FIG. 8 depicts functionality of a user equipment (UE), operable to determine an uplink grant size and uplink grant occurrence frequency, in accordance with an example.

FIG. 8 depicts functionality of a user equipment (UE) 800, operable to determine an uplink grant size and uplink grant occurrence frequency. The UE can comprise one or more processors configured to calculate a downlink (DL) transmission control protocol (TCP) throughput based on a number of TCP acknowledgements (ACKs) at the UE for a selected time period 810. The UE can comprise one or more processors configured to encode a request from the UE to a next generation node B (gNB) for an uplink (UL) grant allocation pattern based on the TCP ACK ratio for a next selected time period 820. The UE can comprise one or more processors configured to decode an uplink grant allocation from the gNB based on the UL grant allocation pattern 830.

In one embodiment, the one or more processors are further configured to calculate the number of TCP ACKs at the UE from one or more of: a TCP stack; or a cellular protocol stack configured to determine the number of TCP ACKs transmitted from the gNB.

In one embodiment, the next time period is equal to the selected time period.

In one embodiment, the one or more processors are further configured to encode the request for the UL grant allocation pattern at a selected frequency.

In one embodiment, the one or more processors are further configured to decode the selected time period and the selected frequency received from the gNB.

In one embodiment, the one or more processors are further configured to encode the request for the UL grant allocation pattern to be sent to the gNB using one or more of: a media access control (MAC) control element (CE); or a radio resource control (RRC) message.

In one embodiment, the one or more processors are further configured to encode the request for the UL grant allocation pattern to be sent to the gNB, wherein the UL grant allocation pattern comprises: an enhanced buffer status report (eBSR); or a bitmap configured to indicate when an UL grant is requested for selected subframes.

Figure 9:
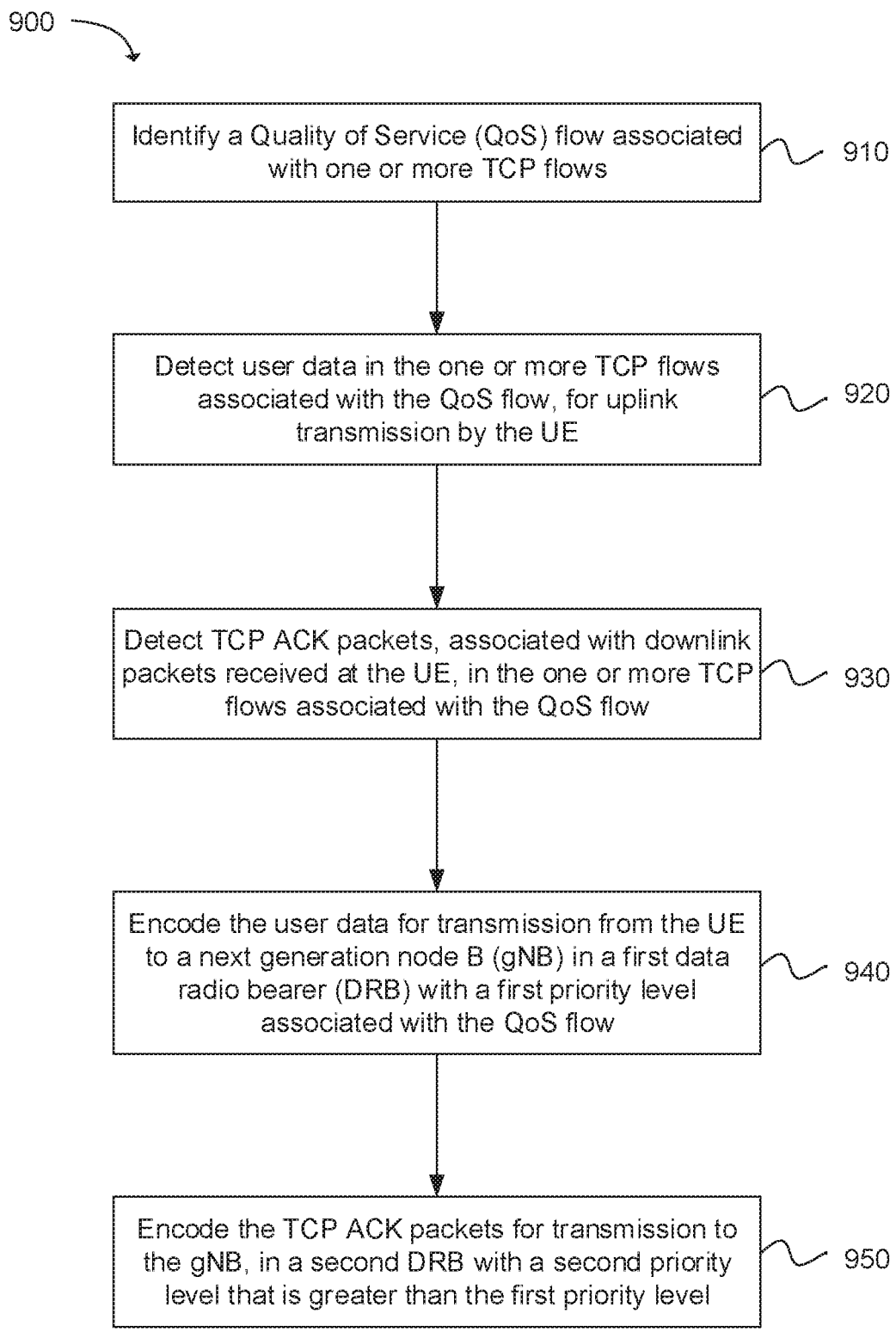
FIG. 9 depicts functionality of a user equipment (UE), operable for transmission of a transmission control protocol (TCP) acknowledgement (ACK) packet, in accordance with an example.

FIG. 9 depicts functionality of a user equipment (UE) 900, operable for transmission of a transmission control protocol (TCP) acknowledgement (ACK) packet. The UE can comprise one or more processors configured to identify a Quality of Service (QoS) flow associated with one or more TCP flows 910. The UE can comprise one or more processors configured to detect user data in the one or more TCP flows associated with the QoS flow, for uplink transmission by the UE 920. The UE can comprise one or more processors configured to detect TCP ACK packets, associated with downlink packets received at the UE, in the one or more TCP flows associated with the QoS flow 930. The UE can comprise one or more processors configured to encode the user data for transmission from the UE to a next generation node B (gNB) in a first data radio bearer (DRB) with a first priority level associated with the QoS flow 940. The UE can comprise one or more processors configured to encode the TCP ACK packets for transmission to the gNB, in a second DRB with a second priority level that is greater than the first priority level 950.

In one embodiment, the one or more processors are further configured to filter a plurality of QoS flows, wherein each QoS flow includes a first DRB for user data and a second DRB for TCP ACK packets, with the second DRB having a higher priority than the first DRB.

In one embodiment, the one or more processors are further configured to detect the TCP ACK packets using one or more of: an ACK bit in a flag field of a TCP header; a protocol type; or a packet size of data packets in the QoS flow relative to a packet size of the TCP ACK packets.

In one embodiment, the one or more processors are further configured to detect the TCP ACK packets by filtering using one or more of: a detection pattern using a traffic flow template (TFT); or a bitmask.

In one embodiment, the one or more processors are further configured to identify a plurality of QoS flows, wherein each QoS flow is associated with a user data DRB; detect the TCP ACK packets associated with the downlink packets received at the UE in the one or more TCP flows associated with the plurality of QoS flows; encode the TCP ACK packets, associated with the plurality of QoS flows, for transmission to the gNB in a dedicated DRB having a priority level that is greater than a priority level of the user data DRBs associated with each QoS flow.

In one embodiment, the one or more processors are further configured to decode radio resource control (RRC) signaling indicating for which of the plurality of QoS flows that TCP ACK prioritization is allowed.

In one embodiment, the one or more processors are further configured to decode non access stratum (NAS) signaling indicating a setup of a higher priority QoS flow associated with a higher priority DRB used to transmit the TCP ACK packets.

Figure 10:
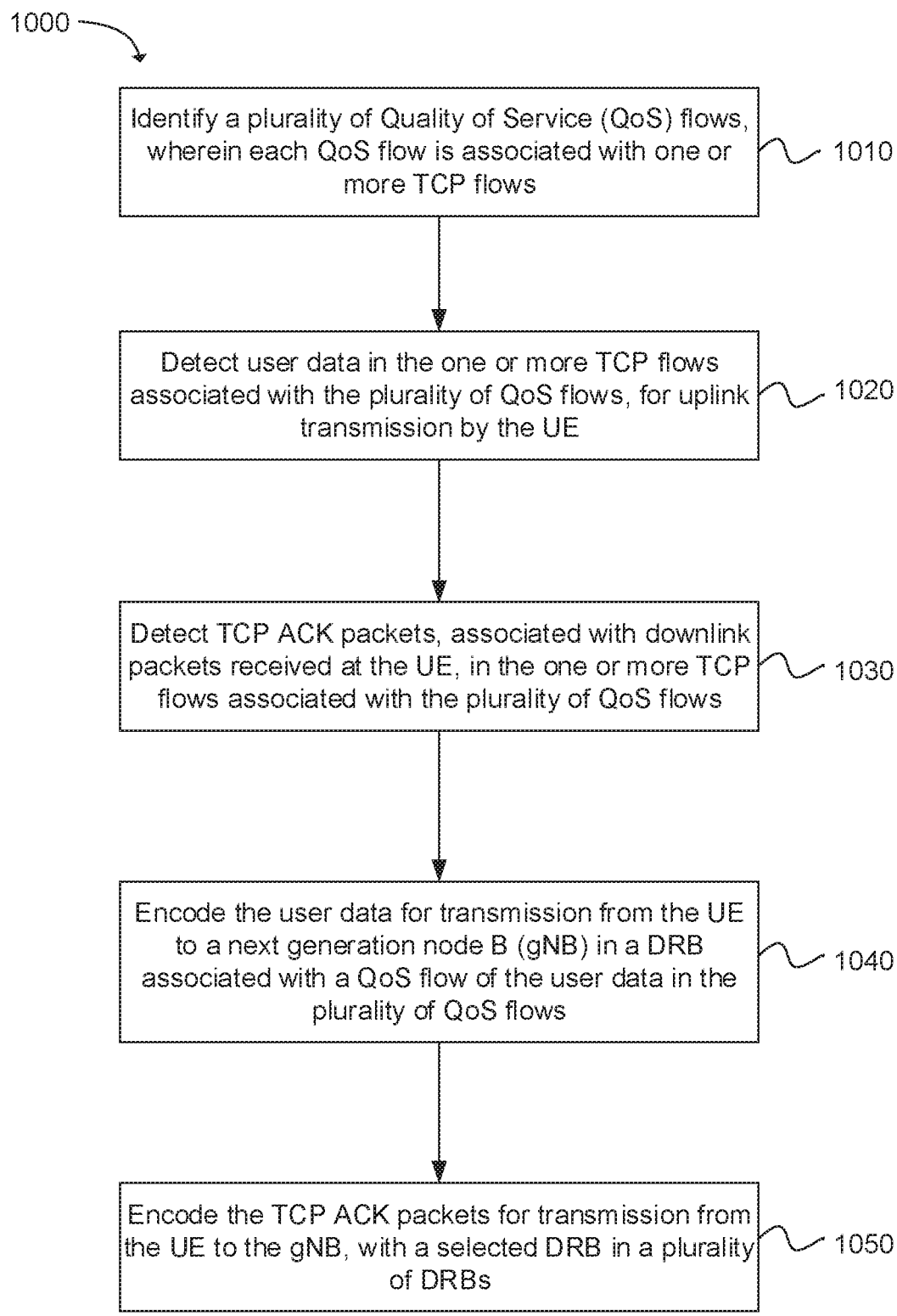
FIG. 10 depicts functionality of a user equipment (UE), operable for transmission of a transmission control protocol (TCP) acknowledgement (ACK) packet in a selected data radio bearer (DRB), in accordance with an example.

FIG. 10 depicts functionality of a user equipment (UE) 1000, operable for transmission of a transmission control protocol (TCP) acknowledgement (ACK) packet in a selected data radio bearer (DRB). The UE can comprise one or more processors configured to identify a plurality of Quality of Service (QoS) flows, wherein each QoS flow is associated with one or more TCP flows 1010. The UE can comprise one or more processors configured to detect user data in the one or more TCP flows associated with the plurality of QoS flows, for uplink transmission by the UE 1020. The UE can comprise one or more processors configured to detect TCP ACK packets, associated with downlink packets received at the UE, in the one or more TCP flows associated with the plurality of QoS flows 1030. The UE can comprise one or more processors configured to encode the user data for transmission from the UE to a next generation node B (gNB) in a DRB associated with a QoS flow of the user data in the plurality of QoS flows 1040. The UE can comprise one or more processors configured to encode the TCP ACK packets for transmission from the UE to the gNB, with a selected DRB in a plurality of DRBs 1050.

In one embodiment, the selected DRB is a DRB with a highest priority in the plurality of DRBs.

In one embodiment, the selected DRB is selected by the gNB and communicated to the UE.

In one embodiment, the one or more processors are further configured to detect the TCP ACK packets using one or more of: an ACK bit in a flag field of a TCP header; a protocol type; or a packet size of data packets in each QoS flow relative to a packet size of the TCP ACK packets.

In one embodiment, the one or more processors are further configured to detect the TCP ACK packets by filtering using one or more of: a detection pattern using a traffic flow template (TFT); or a bitmask.

Figure 11:
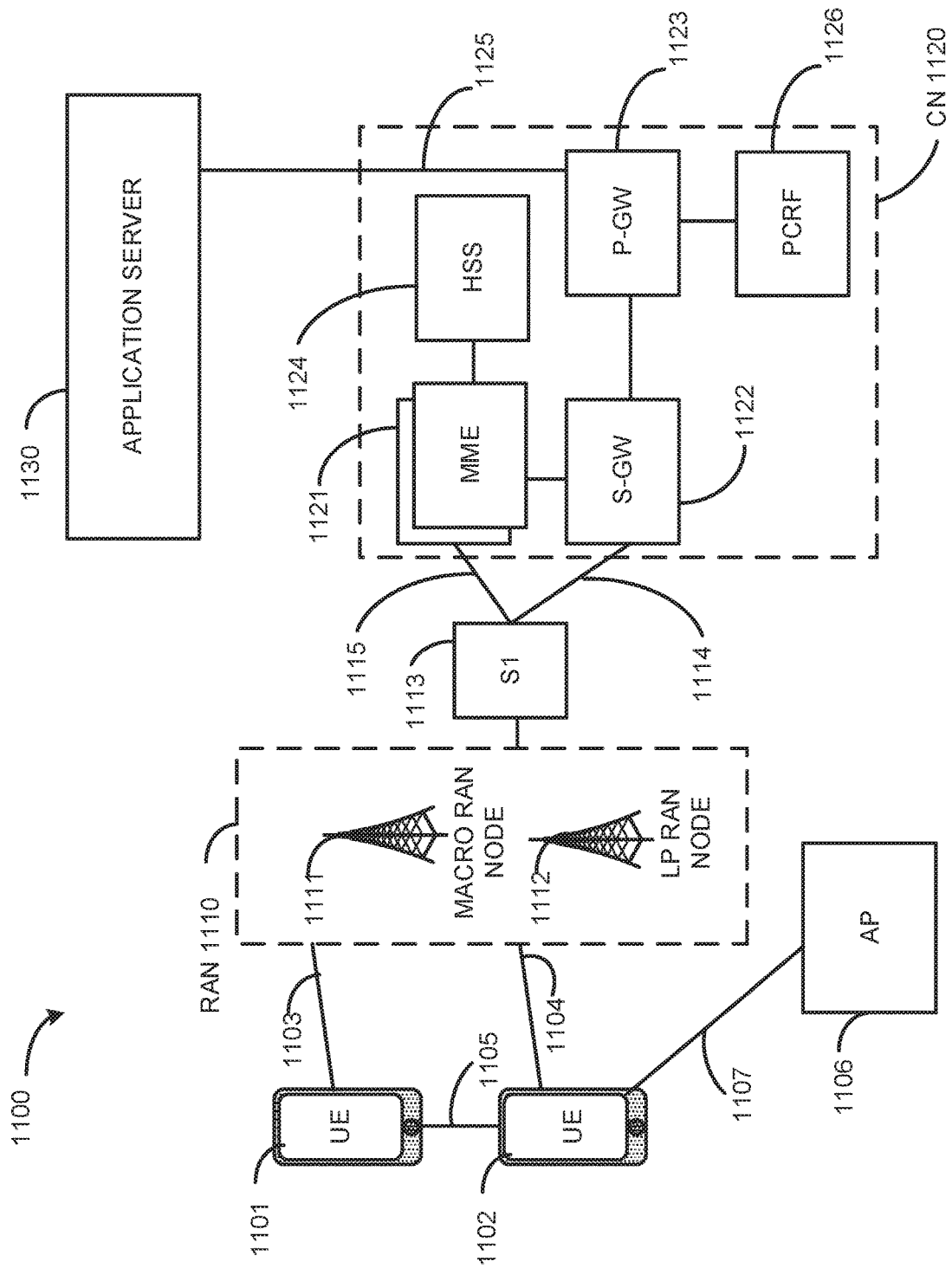
FIG. 11 illustrates an architecture of a network, in accordance with an example.

FIG. 11 illustrates architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a Next Gen RAN (NG RAN), or some other type of RAN. The UEs 1101 and 1102 utilize connections 1103 and 1104, respectively, each of which comprises a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), ne8 Generation NodeBs (gNB), RAN nodes, and so forth, and can comprise ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a Next Gen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1123 and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
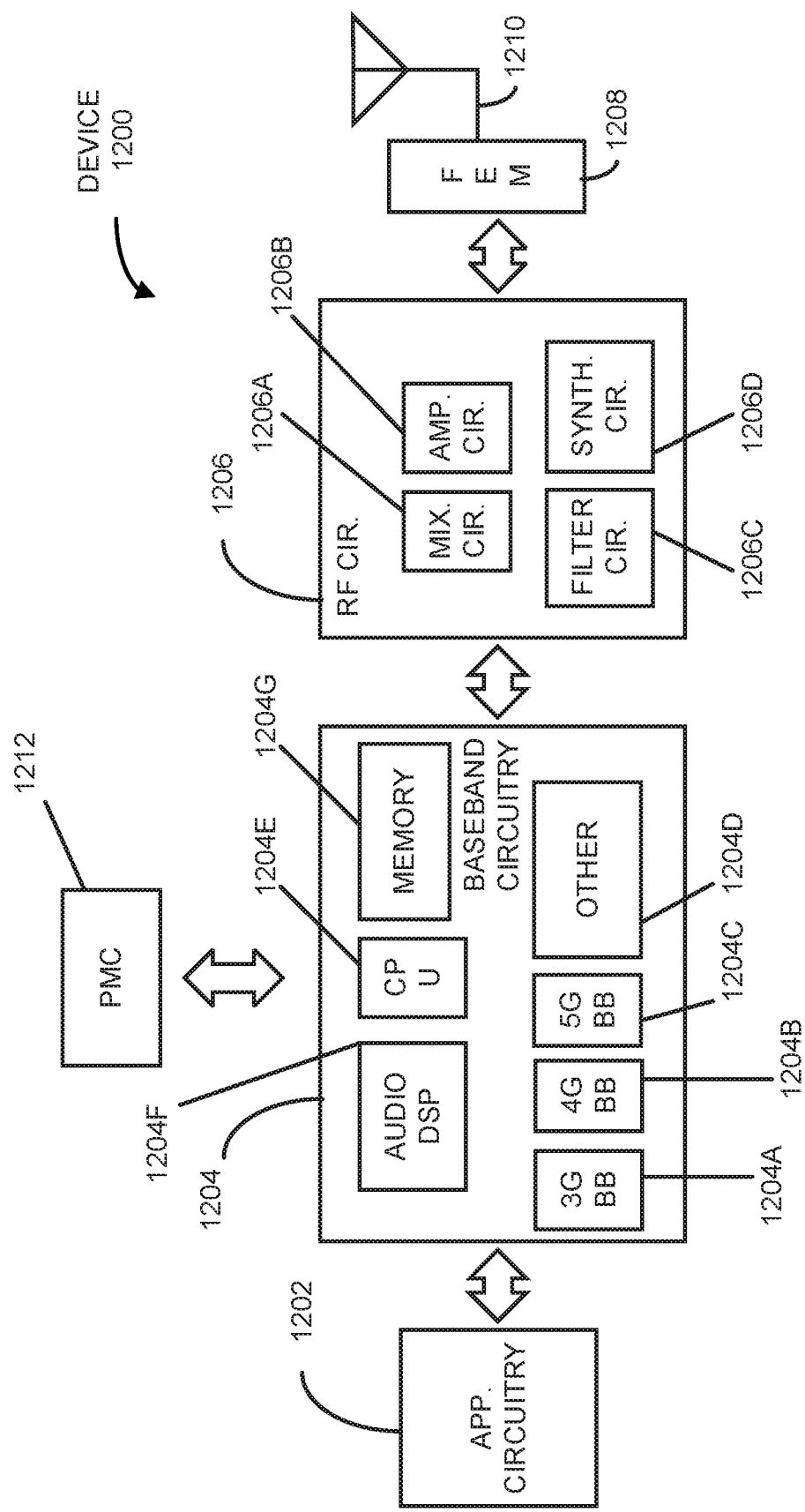
FIG. 12 illustrates a diagram of a wireless device (e.g., UE) and a base station (e.g., eNodeB) in accordance with an example.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206.

In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a necessity. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage controlled oscillator (VCO), although that is not a necessity. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206*d* of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application circuitry 802, RF circuitry 1206, or FEM 1208.

In some embodiments, the PMC 1212 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it can transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
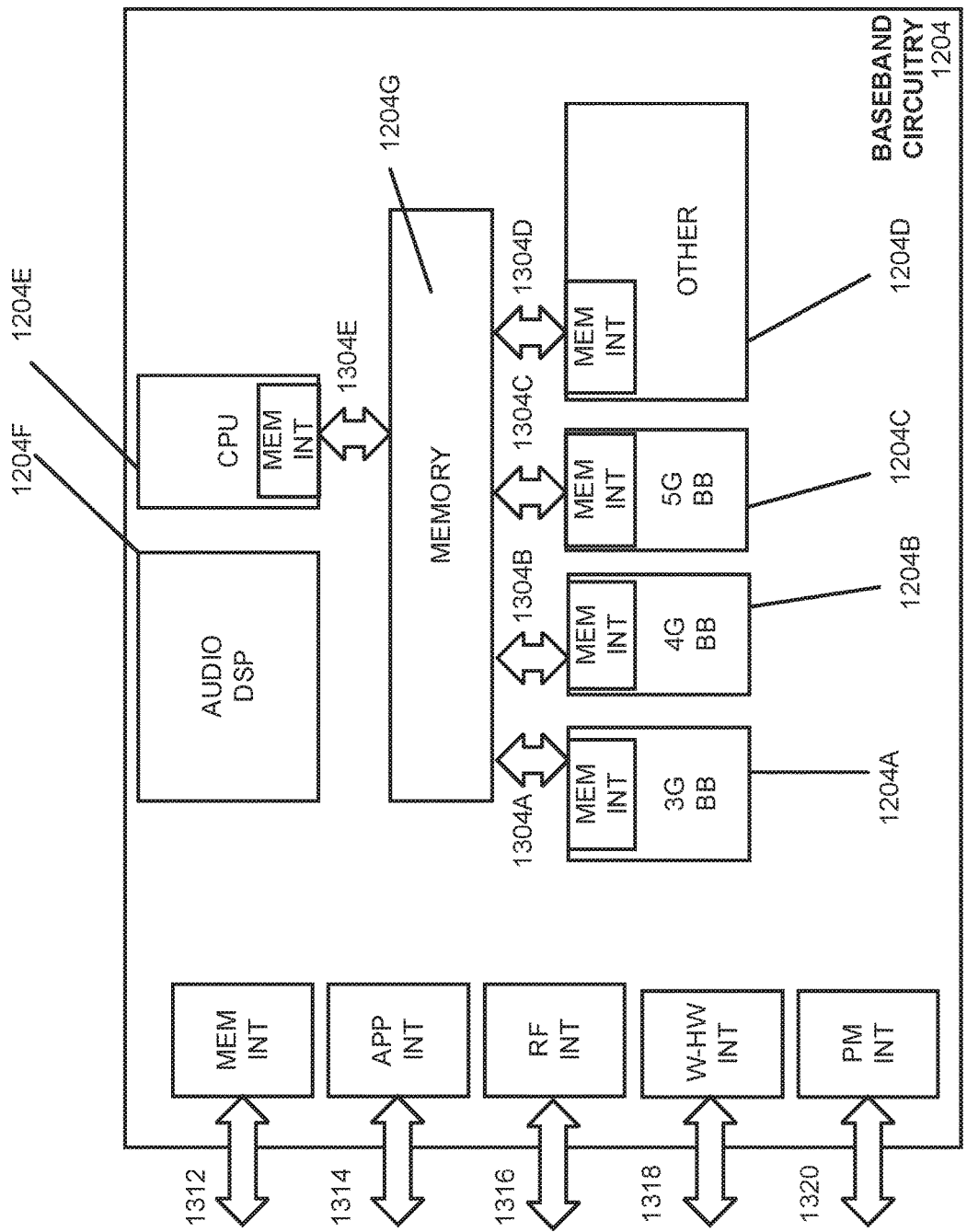
FIG. 13 illustrates example interfaces of baseband circuitry, in accordance with an example.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
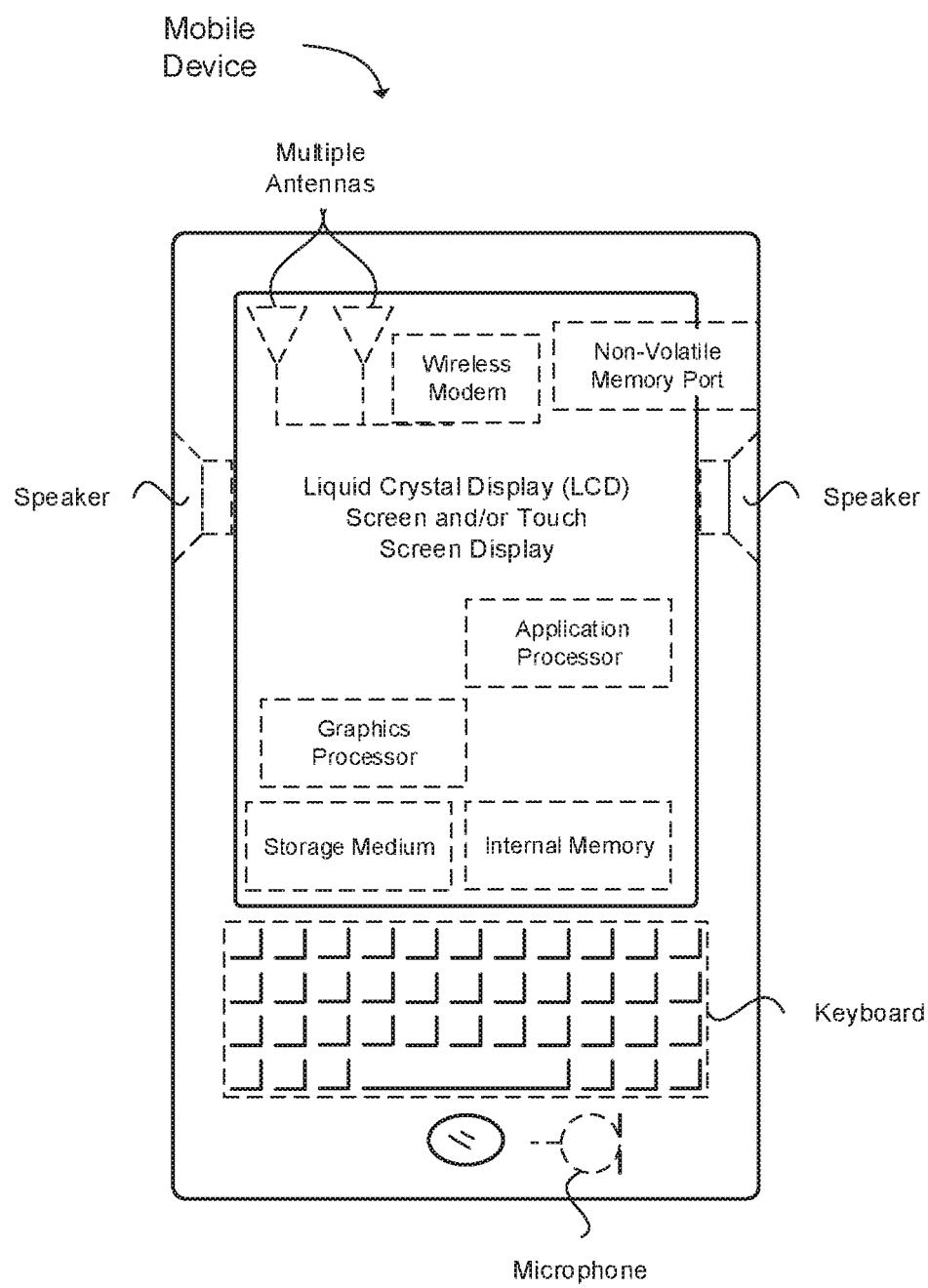
FIG. 14 illustrates a diagram of a wireless device (e.g., UE), in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of a user equipment (UE) operable to generate an enhanced buffer status report (eBSR), the apparatus comprising: one or more processors configured to: identify packets for uplink transmission; filter the packets for uplink transmission, to identify a number of small packets pending for transmission and a number of larger packets, relative to the small packets, that are pending for transmission in the uplink transmission; and encode the eBSR for transmission to a next generation node B (gNB), wherein the eBSR includes information identifying the number of small packets pending for transmission; and a memory interface configured to send to a memory the number of small packets pending for transmission.

Example 2 includes the apparatus of example 1, wherein the one or more processors are further configured to filter the packets for uplink transmission to identify transmission control protocol (TCP) acknowledgement (ACK) packets in the packets for uplink transmission.

Example 3 includes the apparatus of example 1 or 2, wherein the one or more processors are further configured to filter the packets for uplink transmission to identify packets with a packet size less than X bytes as the small packets that are pending for transmission in the uplink transmission, wherein X is an integer greater than 0.

Example 4 includes the apparatus of example 1 or 2, wherein the one or more processors are further configured to encode the eBSR for transmission to the gNB wherein the eBSR includes a logic channel group (LCG) identification (ID) and a count value, wherein the count value includes one or more of: a number of packets with a packet size less than X bytes as the small packets that are pending for transmission in the uplink transmission, wherein X is an integer greater than 0; or a total size of the number of small packets pending for transmission.

Example 5 includes the apparatus of example 4, wherein the one or more processors are further configured to decode from the gNB a reporting method for the eBSR, wherein the reporting method comprises one or more of the total size or the number of packets.

Example 6 includes the apparatus of example 1 or 2, wherein the one or more processors are further configured to decode an uplink (UL) grant received from the gNB, wherein a size of the UL grant and a frequency of the UL grant are determined by the gNB based on the information in the eBSR to identify the number of small packets pending for transmission.

Example 7 includes an apparatus of a user equipment (UE), operable to determine an uplink grant size and uplink grant occurrence frequency, the apparatus comprising: one or more processors configured to: calculate a downlink (DL) transmission control protocol (TCP) throughput based on a number of TCP acknowledgements (ACKs) at the UE for a selected time period; encode a request from the UE to a next generation node B (gNB) for an uplink (UL) grant allocation pattern based on the TCP ACK ratio for a next selected time period; and decode an uplink grant allocation from the gNB based on the UL grant allocation pattern; and a memory interface configured to send to a memory the UL grant allocation pattern.

Example 8 includes the apparatus of example 7, wherein the one or more processors are further configured to calculate the number of TCP ACKs at the UE from one or more of: a TCP stack; or a cellular protocol stack configured to determine the number of TCP ACKs transmitted from the gNB.

Example 9 includes the apparatus of example 7 or 8, wherein the next time period is equal to the selected time period.

Example 10 includes the apparatus of example 7, wherein the one or more processors are further configured to encode the request for the UL grant allocation pattern at a selected frequency.

Example 11 includes the apparatus of example 10, wherein the one or more processors are further configured to decode the selected time period and the selected frequency received from the gNB.

Example 12 includes the apparatus of example 7 or 10, wherein the one or more processors are further configured to encode the request for the UL grant allocation pattern to be sent to the gNB using one or more of: a media access control (MAC) control element (CE); or a radio resource control (RRC) message.

Example 13 includes the apparatus of example 7, wherein the one or more processors are further configured to encode the request for the UL grant allocation pattern to be sent to the gNB, wherein the UL grant allocation pattern comprises: an enhanced buffer status report (eBSR); or a bitmap configured to indicate when an UL grant is requested for selected subframes.

Example 14 includes the apparatus of a user equipment (UE), operable for transmission of a transmission control protocol (TCP) acknowledgement (ACK) packet, the apparatus comprising: one or more processors configured to: identify a Quality of Service (QoS) flow associated with one or more TCP flows; detect user data in the one or more TCP flows associated with the QoS flow, for uplink transmission by the UE; detect TCP ACK packets, associated with downlink packets received at the UE, in the one or more TCP flows associated with the QoS flow; encode the user data for transmission from the UE to a next generation node B (gNB) in a first data radio bearer (DRB) with a first priority level associated with the QoS flow; encode the TCP ACK packets for transmission to the gNB, in a second DRB with a second priority level that is greater than the first priority level; and a memory interface configured to send to a memory the user data.

Example 15 includes the apparatus of example 14, wherein the one or more processors are further configured to filter a plurality of QoS flows, wherein each QoS flow includes a first DRB for user data and a second DRB for TCP ACK packets, with the second DRB having a higher priority than the first DRB.

Example 16 includes the apparatus of example 14 or 15, wherein the one or more processors are further configured to detect the TCP ACK packets using one or more of: an ACK bit in a flag field of a TCP header; a protocol type; or a packet size of data packets in the QoS flow relative to a packet size of the TCP ACK packets.

Example 17 includes the apparatus of example 14 or 16, wherein the one or more processors are further configured to detect the TCP ACK packets by filtering using one or more of: a detection pattern using a traffic flow template (TFT); or a bitmask.

Example 18 includes the apparatus of example 14, wherein the one or more processors are further configured to: identify a plurality of QoS flows, wherein each QoS flow is associated with a user data DRB; detect the TCP ACK packets associated with the downlink packets received at the UE in the one or more TCP flows associated with the plurality of QoS flows; encode the TCP ACK packets, associated with the plurality of QoS flows, for transmission to the gNB in a dedicated DRB having a priority level that is greater than a priority level of the user data DRBs associated with each QoS flow.

Example 19 includes the apparatus of example 18, wherein the one or more processors are further configured to decode radio resource control (RRC) signaling indicating for which of the plurality of QoS flows that TCP ACK prioritization is allowed.

Example 20 includes the apparatus of example 18, wherein the one or more processors are further configured to decode non access stratum (NAS) signaling indicating a setup of a higher priority QoS flow associated with a higher priority DRB used to transmit the TCP ACK packets.

Example 21 includes an apparatus of a user equipment (UE), operable for transmission of a transmission control protocol (TCP) acknowledgement (ACK) packet in a selected data radio bearer (DRB), the apparatus comprising: one or more processors configured to: identify a plurality of Quality of Service (QoS) flows, wherein each QoS flow is associated with one or more TCP flows; detect user data in the one or more TCP flows associated with the plurality of QoS flows, for uplink transmission by the UE; detect TCP ACK packets, associated with downlink packets received at the UE, in the one or more TCP flows associated with the plurality of QoS flows; encode the user data for transmission from the UE to a next generation node B (gNB) in a DRB associated with a QoS flow of the user data in the plurality of QoS flows; encode the TCP ACK packets for transmission from the UE to the gNB, with a selected DRB in a plurality of DRBs; and a memory interface configured to send to a memory the user data.

Example 22 includes the apparatus of example 21, wherein the selected DRB is a DRB with a highest priority in the plurality of DRBs.

Example 23 includes the apparatus of example 21 or 22, wherein the selected DRB is selected by the gNB and communicated to the UE.

Example 24 includes the apparatus of example 21, wherein the one or more processors are further configured to detect the TCP ACK packets using one or more of: an ACK bit in a flag field of a TCP header; a protocol type; or a packet size of data packets in each QoS flow relative to a packet size of the TCP ACK packets.

Example 25 includes the apparatus of example 21 or 24, wherein the one or more processors are further configured to detect the TCP ACK packets by filtering using one or more of: a detection pattern using a traffic flow template (TFT); or a bitmask.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), operable to generate an enhanced buffer status report (eBSR), the apparatus comprising:
   one or more processors configured to:
      identify packets for uplink transmission;
      filter the packets for uplink transmission, to identify a number of small packets pending for transmission and a number of larger packets, relative to the small packets, that are pending for transmission in the uplink transmission; and
      encode the eBSR for transmission to a next generation node B (gNB), wherein the eBSR includes information identifying the number of small packets pending for transmission, wherein the eBSR includes a count value, wherein the count value includes a total size of the number of small packets pending for transmission, wherein the total size is the size of two or more pending small packets added together; and
   a memory interface configured to send to a memory the number of small packets pending for transmission.

2. The apparatus of claim 1, wherein the one or more processors are further configured to filter the packets for uplink transmission to identify transmission control protocol (TCP) acknowledgement (ACK) packets in the packets for uplink transmission.

3. The apparatus of claim 1, wherein the one or more processors are further configured to filter the packets for uplink transmission to identify packets with a packet size less than X bytes as the small packets that are pending for transmission in the uplink transmission, wherein X is an integer greater than 0.

4. The apparatus of claim 1, wherein the one or more processors are further configured to encode the eBSR for transmission to the gNB wherein the eBSR includes a logic channel group (LCG) identification (ID) and the count value, wherein the count value includes:

a number of packets with a packet size less than X bytes as the small packets that are pending for transmission in the uplink transmission, wherein X is an integer greater than 0.

5. The apparatus of claim 4, wherein the one or more processors are further configured to decode from the gNB a reporting method for the eBSR, wherein the reporting method comprises one or more of the total size or the number of packets.

6. The apparatus of claim 1, wherein the one or more processors are further configured to decode an uplink (UL) grant received from the gNB, wherein a size of the UL grant and a frequency of the UL grant are determined by the gNB based on the information in the eBSR to identify the number of small packets pending for transmission.

7. A method for a user equipment (UE) to generate an enhanced buffer status report (eBSR), the method comprising:
identifying packets for uplink transmission;
filtering the packets for uplink transmission, to identify a number of small packets pending for transmission and a number of larger packets, relative to the small packets, that are pending for transmission in the uplink transmission; and
encoding the eBSR for transmission to a next generation node B (gNB), wherein the eBSR includes information identifying the number of small packets pending for transmission, wherein the eBSR includes a count value, wherein the count value includes a total size of the number of small packets pending for transmission, wherein the total size is the size of two or more pending small packets added together; and
sending to a memory the number of small packets pending for transmission.

8. The method of claim 7, further comprising filtering the packets for uplink transmission to identify transmission control protocol (TCP) acknowledgement (ACK) packets in the packets for uplink transmission.

9. The method of claim 7, further comprising filtering the packets for uplink transmission to identify packets with a packet size less than X bytes as the small packets that are pending for transmission in the uplink transmission, wherein X is an integer greater than 0.

10. The method of claim 7, further comprising encoding the eBSR for transmission to the gNB wherein the eBSR includes a logic channel group (LCG) identification (ID) and the count value, wherein the count value includes:
a number of packets with a packet size less than X bytes as the small packets that are pending for transmission in the uplink transmission, wherein X is an integer greater than 0.

11. The method of claim 10, further comprising decoding from the gNB a reporting method for the eBSR, wherein the reporting method comprises one or more of the total size or the number of packets.

12. The method of claim 7, further comprising decoding an uplink (UL) grant received from the gNB, wherein a size of the UL grant and a frequency of the UL grant are determined by the gNB based on the information in the eBSR to identify the number of small packets pending for transmission.

13. At least one non-transitory machine readable storage medium having instructions stored thereon that, when executed by one or more processors of a user equipment (UE), cause the one or more processors to:
identify packets for uplink transmission;
filter the packets for uplink transmission, to identify a number of small packets pending for transmission and a number of larger packets, relative to the small packets, that are pending for transmission in the uplink transmission; and
encode the eBSR for transmission to a next generation node B (gNB), wherein the eBSR includes information identifying the number of small packets pending for transmission, wherein the eBSR includes a logic channel group (LCG) identification (ID) and a count value, wherein the count value includes a total size of the number of small packets pending for transmission, wherein the total size is the size of two or more pending small packets added together; and
send to a memory the number of small packets pending for transmission.

14. The at least one non-transitory machine readable storage medium of claim 13, wherein the instructions further cause the one or more processors to filter the packets for uplink transmission to identify transmission control protocol (TCP) acknowledgement (ACK) packets in the packets for uplink transmission.

15. The at least one non-transitory machine readable storage medium of claim 13, wherein the instructions further cause the one or more processors to filter the packets for uplink transmission to identify packets with a packet size less than X bytes as the small packets that are pending for transmission in the uplink transmission, wherein X is an integer greater than 0.

16. The at least one non-transitory machine readable storage medium of claim 13, wherein the instructions further cause the one or more processors to encode the eBSR for transmission to the gNB wherein the eBSR includes a logic channel group (LCG) identification (ID) and the count value, wherein the count value includes:
a number of packets with a packet size less than X bytes as the small packets that are pending for transmission in the uplink transmission, wherein X is an integer greater than 0.

17. The at least one non-transitory machine readable storage medium of claim 16, wherein the instructions further cause the one or more processors to decode from the gNB a reporting method for the eBSR, wherein the reporting method comprises one or more of the total size or the number of packets.

18. The at least one non-transitory machine readable storage medium of claim 13, wherein the instructions further cause the one or more processors to decode an uplink (UL) grant received from the gNB, wherein a size of the UL grant and a frequency of the UL grant are determined by the gNB based on the information in the eBSR to identify the number of small packets pending for transmission.

* * * * *